No. 789,483. PATENTED MAY 9, 1905.
W. W. BROGA.
FLUSHING APPARATUS FOR WATER CLOSET BOWLS.
APPLICATION FILED MAY 16, 1904.

3 SHEETS—SHEET 1.

Witnesses:
H. L. Sprague
A. V. Leahy

Inventor.
William W. Broga,
by W. H. Bellows
Attorney.

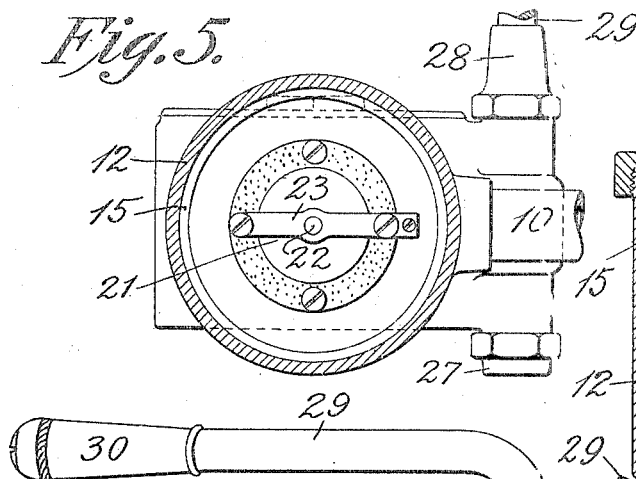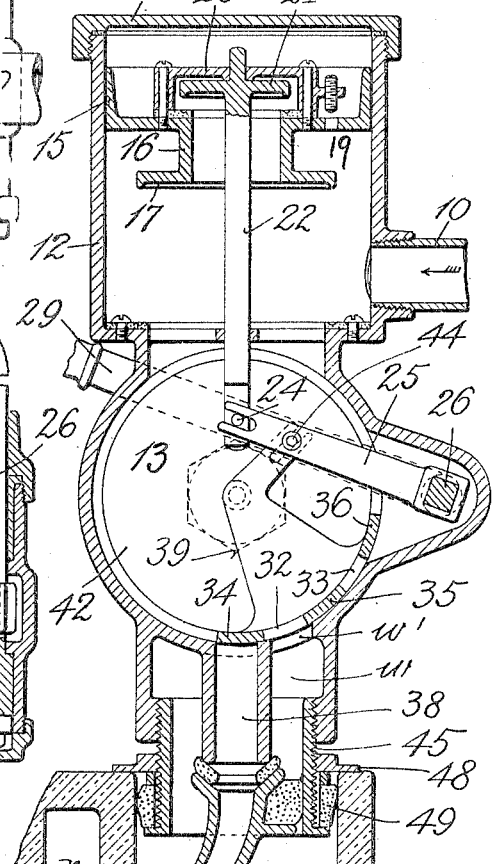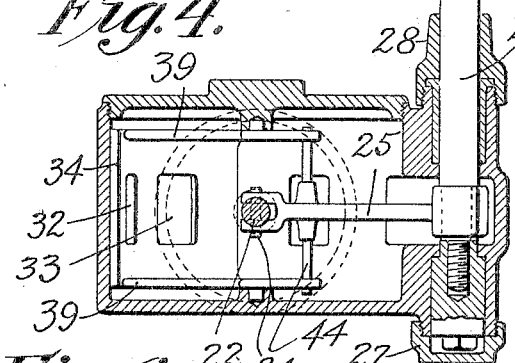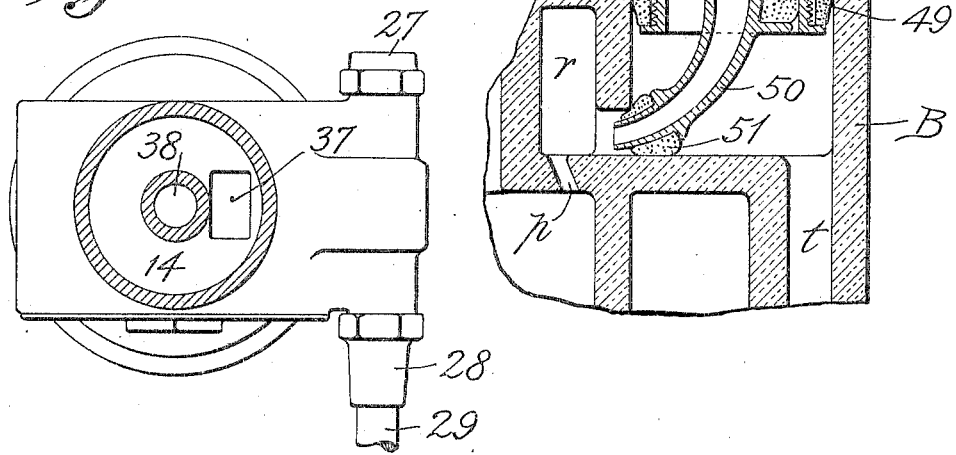

No. 789,483. PATENTED MAY 9, 1905.
W. W. BROGA.
FLUSHING APPARATUS FOR WATER CLOSET BOWLS.
APPLICATION FILED MAY 16, 1904.
3 SHEETS—SHEET 3.
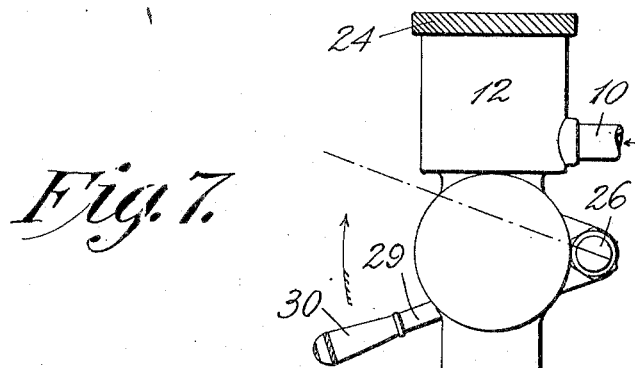
Fig. 7.
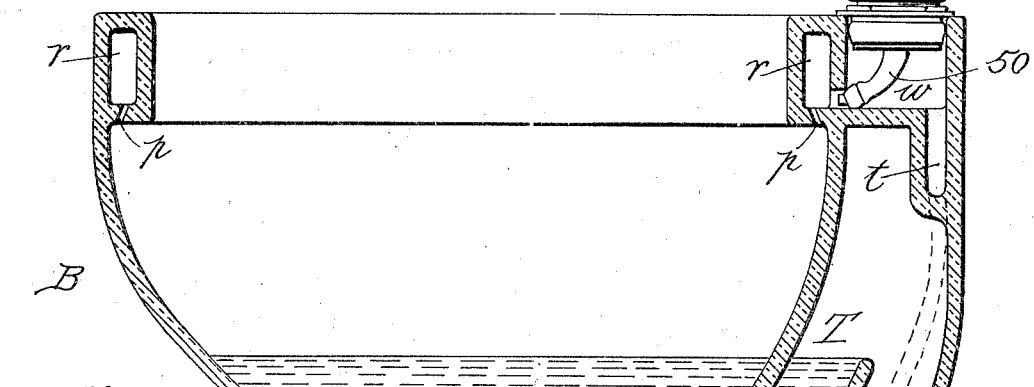
Fig. 8.
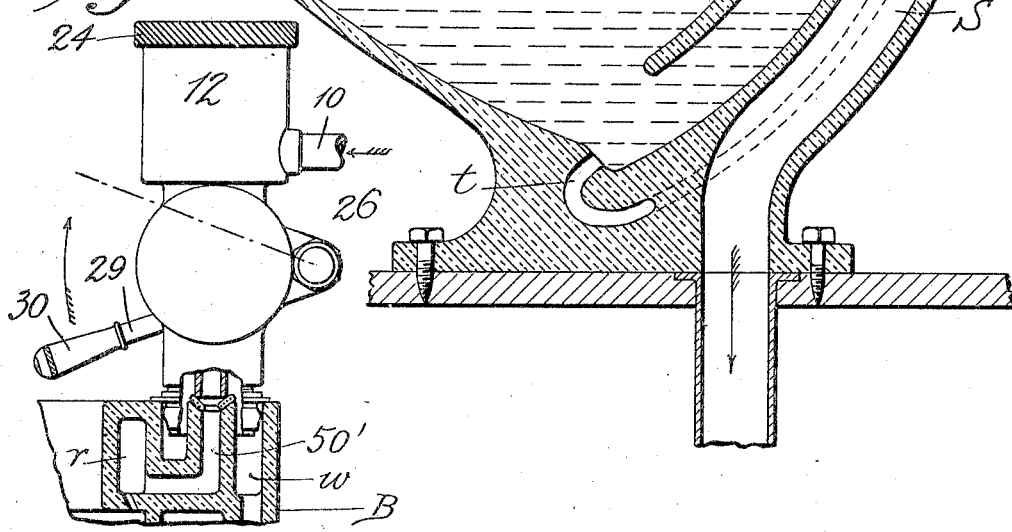
Witnesses:
H. L. Sprague
A. T. Leahy
Inventor.
William W. Broga,
by W. T. Bellows,
Attorney.

No. 789,483.

Patented May 9, 1905.

UNITED STATES PATENT OFFICE.

WILLIAM W. BROGA, OF SPRINGFIELD, MASSACHUSETTS.

FLUSHING APPARATUS FOR WATER-CLOSET BOWLS.

SPECIFICATION forming part of Letters Patent No. 789,483, dated May 9, 1905.

Application filed May 16, 1904. Serial No. 208,102.

*To all whom it may concern:*

Be it known that I, WILLIAM W. BROGA, a citizen of the United States of America, and a resident of Springfield, in the county of Hampden and State of Massachusetts, have invented certain new and useful Improvements in Flushing Apparatus for Water-Closet Bowls, of which the following is a full, clear, and exact description.

This invention relates to flushing mechanism for water-closet bowls, and more especially to that class thereof in which the bowl comprises what is generally known as a "rim-spray" and also a trap or seal stream; and it has for one of its objects the provision of a device whereby water is supplied to either the rim or to the trap in succession, so as to concentrate its force into one particular part of the bowl at any one time.

My invention has, furthermore, for its object the provision of a distributing-valve for admitting and shutting off the water-supply for either the rim or trap in regular order and alternately and finally admitting water to both the rim and trap simultaneously.

My invention has, furthermore, for its object the combination, with the water-supply pipe, of a balanced shut-off valve interposed between the source of water-supply and distributing-valve and comprising a pair of independently-operable valve-disks of different areas, the smaller disk being operable by a handle to relieve the pressure on the main disk, which controls the admission of a large body of water to the chamber of the distributing-valve.

Further objects of my invention will be found in the particular construction and organization of some of the components of the device, as illustrated in the accompanying drawings, in which similar characters denote similar parts, and in which—

Figure 2:
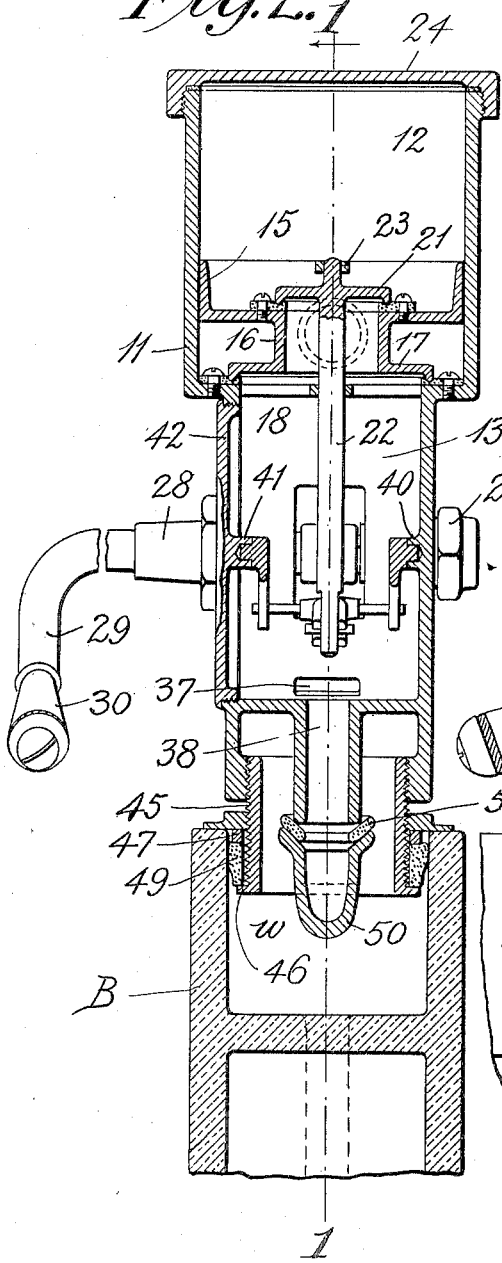
Figure 1:
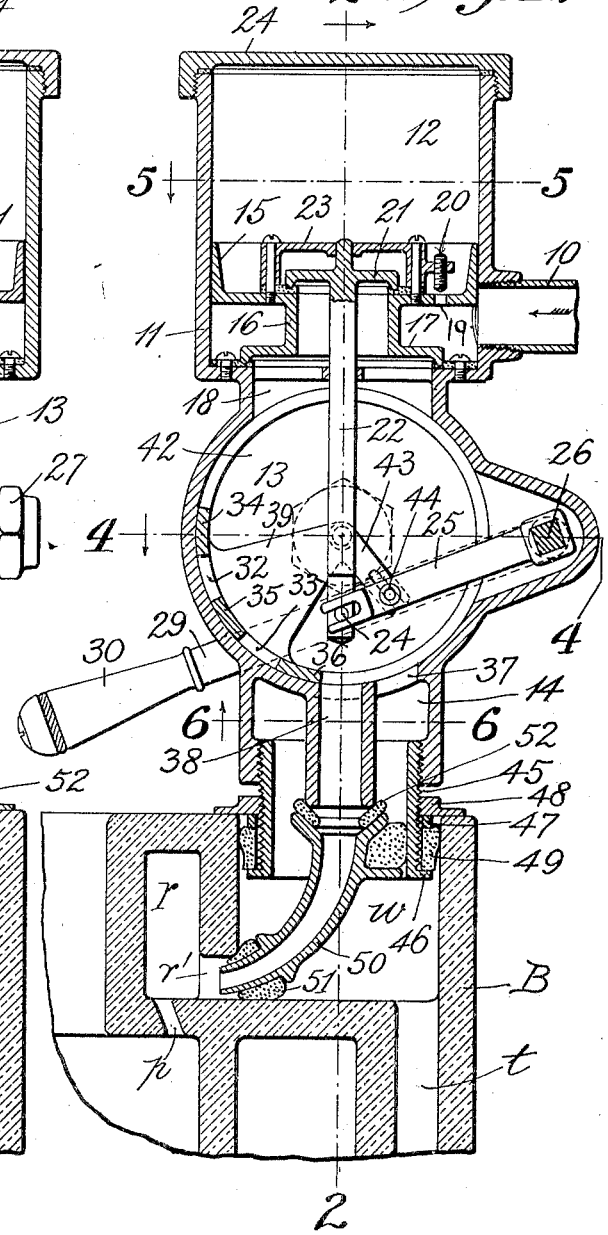

Figure 1 is a vertical central section of my improved mechanism applied to a bowl of ordinary construction and taken on line 1 1, Fig. 2. Fig. 2 is a section on line 2 2 of Fig. 1. Fig. 3 is a view similar to Fig. 1 and illustrates the main valve in its raised or open position. Fig. 4 is a horizontal section on line 4 4 of Fig. 1. Fig. 5 shows a horizontal section on lines 5 5 of Fig. 1. Fig. 6 represents a section on line 6 6, Fig. 1. Fig. 7 is a central section of an ordinary bowl and illustrates my improved mechanism applied thereto, and Fig. 8 shows a fragmentary view of a bowl as especially adapted for my improved device.

Briefly stated, my improved device comprises a main valve for cutting off the water-supply, this valve being of ample capacity to admit a large body of water under pressure, and inasmuch as considerable power would be required to raise this valve from its seat I provide in the main valve a small valve of greatly-reduced area, which may be easily operated by hand, and thus relieve the pressure on the main valve, which is subsequently raised to admit a full supply to a movable distributing-valve having a series of ports and bridges which during its return movement will admit water into the rim and the trap alternately and finally to both simultaneously, while the main valve gradually closes during the return movement of the distributing-valve.

In the drawings, 10 denotes the water-supply pipe, which may be connected directly with a main or with a tank, as desired. Secured to the end of the pipe 10 is my improved flushing device, comprising a casing 11, which is divided into a series of preferably superposed chambers 12, 13, and 14, respectively. The receiving-chamber 12 is formed cylindrical and contains the main cut-off valve, consisting of a piston 15, having a neck portion 16 and a valve-disk 17, adapted to close the passage 18, leading to the distributing-valve chamber 13. The web of the piston 15 has an aperture 19, through which water may enter into the closed portion of the chamber 12 and as controlled by an adjusting-screw 20, as will be readily understood. The neck portion 16 is tubular, and its uper opening is normally closed by a primary relief-valve 21, the stem 22 of which may be guided by a bar or yoke 23, secured to the piston 15 in any convenient manner. Inasmuch as the top of the chamber 12 is tightly closed—as, for instance, by a cover 24—it follows that considerable pressure is brought to bear upon the piston or main valve 17, and therefore I prefer to manipulate the smaller valve-disk 21 by any suitable mechanism or in the manner shown in Fig. 1, in which the lower end of the stem 22 carries a pin 24 in engagement with the bifurcated or slotted end of a lever 25, mounted on a rock-shaft 26, which may be journaled in bearings 27 28 of the casing 11 and the outer end of which may be bent to constitute a lever 29, having a weighted handle 30.

From the foregoing it will be seen that when the handle 30 is raised the primary valve 21 will be lifted from its seat until it strikes the under side of the yoke 23, at which time the water above the piston 15 and the valve 21 will be free to pass through the tubular neck 16, thus relieving the pressure above the piston 15, and consequently rendering it easy to continue the upward movement of the handle 30, and thereby raise the piston 15 bodily, and with it the main valve 17, as seen in Fig. 3. Water is now directly admitted from the supply-pipe 10 into the distributing-valve chamber 13, where it is conducted to the rim or the trap portion of the bowl, according to the position of the distributing-valve. This valve consists in the preferred form thereof shown of a segmental shell, consisting, preferably, of a series of ports 32 33 and bridges or solid portions 34 35 36, adapted to close an aperture 37, leading into the lowermost chamber 14, and also the mouth of a tube 38, connected with the rim of the bowl. The segmental shell is provided with trunnion-arms 39, journaled for oscillation in hubs 40 41 of the casing 11 and its side cover 42, respectively, said arms having extensions 43, engaged by laterally-projecting pins 44, carried by the valve-actuator 25, above mentioned, so that when the handle 30 is raised the main valve will be raised, and the distributing-valve will be simultaneously moved to the position shown in Fig. 3.

Before proceeding with the particular operation of the distributing-valve it may be of benefit to explain the connection between my improved flushing device and the bowl, an ordinary form of which is illustrated in the drawings, excepting Fig. 8. Referring more especially to Fig. 7, the bowl B has near its top an annular chamber $r$ in communication with the water-inlet chamber $w$ by a passage $r'$ and having a series of perforations $p$ for directing the spray against the inside of the bowl, which is provided with the usual trap T, soil-pipe S, and also the trap-cleaning conduit which leads directly from the chamber $w$ into the bottom of the bowl B, as indicated by dotted lines. It is therefore evident that water conducted into the chamber $w$ could enter the rim and the trap at the same time; but since it is one particular object of my invention to distinctly separate the rim from the trap, and so that the distributing-valve may become instrumental in directing the flow of water into these channels separately, means are provided whereby the rim-channel $r$ is disconnected from the chamber $w$, as follows: In screw-threaded engagement with the casing 11 and entering the chamber 14 thereof is a thimble 45, having a flange 46 and carrying a ring 47 and a nut 48 for compressing a packing-ring 49 to contact tightly with the wall of the chamber $w$. The thimble 45 is also provided with a conduit-tube 50, which is curved to enter the passage $r'$ and has packing 51 for completely stopping all communication between the rim $r$ and the chamber $w$. The upper end of the tube 50 is flaring to receive a packing-ring 52 to form a tight union between the tubes 50 and 38. Hence it will be seen that water passing through the tube 38 can only enter the rim $r$, while the water entering the chamber 14 can pass through the thimble 45 into the chamber $w$ and thence only into the trap-conduit $t$. Of course it is evident that these conditions may be reversed, so as to connect the pipe 38 with the channel $t$, and the chamber $w$ may remain in communication with the rim-channel $r$, if so preferred.

In Fig. 8 the construction of the bowl B is especially adapted for my improved flushing device, the tube 50 being supplanted by a conduit 50', constituting a part of the bowl, and isolating the rim-channel $r$ from the channel $w$ in the same manner as above described.

Referring now again to the distributing-valve, as shown in Fig. 3, it will be seen that the tube 38 is closed by the bridge 34 and that water from the supply-pipe 10 is passing through the port 32 into the chamber $w$, through the thimble 45, into the trap-conduit $t$, thus washing out the trap T and dislodging all sediment in the bottom of the bowl and discharging the same into the soil-pipe S. Consequently the water-level in the bowl will gradually fall until the valve-shell has been returned by the gravitating handle 30 sufficiently to bring the bridge 35 over the port $w'$ of the chamber $w$ and simultaneously establishing a flow of water under pressure into the tube 38, thus flushing the rim only. A continuation of the valve-shell movement will again admit water into the chamber $w$ through port 33, while the bridge 35 closes the tube 38 until finally the valve-shell has returned to its normal position, (shown in Fig. 1,) in which both the tube 38 and the chamber $w$ are in open connection with the distributing-valve chamber 13 and drain the same, it being of course evident that the water-supply has been completely shut off by virtue of the valves 21 and 17 reseating themselves, as seen in Fig. 1. The speed with which the distributing-valve returns to normal depends, of course, upon the weight of the gravitating parts of my improved device and upon the freedom with which water may pass through the aperture 19 in the valve-piston, inasmuch as the valve 21 will be closed by the weighted handle 30 immediately when the latter is released, the piston 15 then descending also, but not faster than water can enter the chamber 12 above the piston 15 and as may be regulated as desired by the regulating or adjusting screw 20.

Many changes may be made in the construction and organization shown in the drawings, and it should be distinctly understood that the entire device may operate in other than vertical position, so that I do not limit my invention to gravitative elements as described.

Having thus described my invention, what I claim, and desire to secure by Letters Patent, is—

1. The combination, with a water-supply, a bowl having a flushing-rim and trap, of a casing comprising a receiving-chamber and a distributing-valve chamber connected therewith and having ports, a piston movable in said receiving-chamber and for closing the passage from said receiving-chamber into the distributing-chamber, a distributing-valve having ports coöperative with the ports of the valve-chamber and for admitting water to the flushing-rim and the trap, alternately, and a lever-and-link connection for reciprocating the shut-off valve; and for oscillating the distributing-valve, simultaneously.

2. The combination, with a water-supply, a bowl having a flushing-rim and a trap, of a casing comprising a receiving-chamber and a distributing-valve chamber connected therewith and having ports, a piston comprising a primary valve and a main valve for closing the passage from said receiving-chamber into the distributing-chamber, said primary valve being movable independently of the main valve, means for limiting the movement of the primary valve relative to the main valve, and a distributing-valve having ports coöperative with the ports of the valve-chamber and for admitting water to the flushing-rim and the trap, alternately.

3. The combination, with a water-supply, and a bowl having a flushing-rim and a trap, of a casing comprising a receiving-chamber and a distributing-valve chamber connected therewith and having ports, a piston having a tubular passage therethrough, a primary valve for closing said passage, a main-valve disk carried by said piston, for closing the passage from the receiving to the distributing chamber, a distributing-valve having ports coöperative with the ports of the valve-chamber and for admitting water to the flushing-rim and the trap, alternately, and means for actuating the primary valve and the distributing-valve simultaneously.

4. The combination, with the water-supply, and a bowl having a flushing-rim and a trap, of a casing comprising a receiving-chamber and a distributing-valve chamber having ports, a piston having a tubular passage therethrough, a primary valve for closing said passage, a main-valve disk carried by said piston, a distributing-valve chamber and for admitting water to the flushing-rim and the trap, alternately, and an oscillatory lever for actuating the primary valve and the distributing-valve simultaneously.

5. The combination, with a water-supply, and a bowl having a flushing-rim and a trap, of a casing comprising a receiving-chamber and a distributing-chamber connected therewith and having ports, a piston for closing the passage between said chambers, and having a tubular passage therethrough, a primary valve for closing said passage, a main-valve disk carried by said piston, a distributing-valve having ports coöperative with the ports of the valve-chamber and for admitting water to the flushing-rim and the trap alternately, and a lever-and-link connection for reciprocating the shut-off valve, and for oscillating the distributing-valve, simultaneously.

6. The combination, with a water-supply, and a bowl having a flushing-rim and a trap, of a casing comprising a receiving-chamber and a distributing-valve chamber connected therewith and having ports, a shut-off valve for closing the passage from said receiving-chamber into the distributing-chamber, a distributing-valve having ports coöperative with the ports of the valve-chamber and for admitting water to the flushing-rim and the trap alternately, means for operating said shut-off valve and the distributing-valve simultaneously, and a gravitative device for normally closing the shut-off valve.

7. The combination, with a water-supply, and a bowl having a flushing-rim and a trap, of a casing comprising a receiving-chamber and a distributing-valve chamber connected therewith and having ports, a shut-off valve for closing the passage from said receiving-chamber into the distributing-chamber, a distributing-valve having ports coöperative with the ports of the valve-chamber, and for admitting water to the flushing-rim and the trap, alternately, means for operating said shut-off valve and the distributing-valve simultaneously, a gravitative device for normally closing the shut-off valve, and means for repeatedly admitting water to the flushing-rim and the trap, alternately, during the closing movement of the shut-off valve.

8. The combination, with a water-supply, and a bowl having a flushing-rim and a trap, of a casing comprising a receiving-chamber, a distributing-valve chamber, and a discharge-chamber connected with the trap and having a port in communication with the distributing-chamber, a shut-off valve for closing the passage from said receiving-chamber into the distributing-chamber, a distributing-valve having ports coöperative with the ports of the valve-chamber and for admitting water to the flushing-rim and the trap, alternately, means for actuating the primary valve and the distributing-valve simultaneously, and means for repeatedly admitting water to the flushing-ring and the trap, alternately, during the closing movement of the shut-off valve.

9. The combination, with a water-supply, and a bowl having a flushing-rim and a trap, of a casing comprising a receiving-chamber closed at one end, and a distributing-chamber having ports, a piston movable in said receiving-chamber and for closing the passage from said receiving-chamber into the distributing-chamber, said piston having an aperture for permitting the flow of water from the supply into the closed portion of the receiving-chamber, a distributing-valve having ports coöperative with the ports of the valve-chamber and for admitting water to the flushing-rim and the trap, respectively, and a gravitative device for normally closing the shut-off valve.

Signed by me at Springfield, Massachusetts, in presence of two subscribing witnesses.

WILLIAM W. BROGA.

Witnesses:
    WM. S. BELLOWS,
    A. V. LEAHY.